(12) United States Patent  
Goubin et al.

(10) Patent No.: US 8,000,473 B2  
(45) Date of Patent: Aug. 16, 2011

(54) METHOD AND APPARATUS FOR GENERATING CRYPTOGRAPHIC SETS OF INSTRUCTIONS AUTOMATICALLY AND CODE GENERATOR

(75) Inventors: Louis Goubin, Meudon (FR); Nicolas Courtois, Meudon (FR)

(73) Assignee: Gemalto SA, Meudon (FR)

( * ) Notice: Subject to any disclaimer, the term of this patent is extended or adjusted under 35 U.S.C. 154(b) by 846 days.

(21) Appl. No.: 11/576,437

(22) PCT Filed: Oct. 7, 2005

(86) PCT No.: PCT/IB2005/002976  
§ 371 (c)(1),  
(2), (4) Date: Mar. 30, 2007

(87) PCT Pub. No.: WO2006/038104  
PCT Pub. Date: Apr. 13, 2006

(65) Prior Publication Data  
US 2008/0063192 A1 Mar. 13, 2008

(30) Foreign Application Priority Data  
Oct. 7, 2004 (EP) .................................... 04292387

(51) Int. Cl.  
*H04L 9/00* (2006.01)

(52) U.S. Cl. ............ 380/46; 380/28; 345/426; 345/473; 345/634

(58) Field of Classification Search .................... 380/46, 380/28; 345/426, 473, 634; 340/970  
See application file for complete search history.

(56) References Cited

U.S. PATENT DOCUMENTS

| | | | | |
|---|---|---|---|---|
| 5,963,646 A * | 10/1999 | Fielder et al. | ................ | 380/259 |
| 6,105,133 A * | 8/2000 | Fielder et al. | ................ | 713/169 |
| 6,278,783 B1 * | 8/2001 | Kocher et al. | ................ | 380/277 |
| 2001/0053220 A1 * | 12/2001 | Kocher et al. | ................ | 380/29 |
| 2003/0095122 A1 * | 5/2003 | Herken et al. | ................ | 345/426 |
| 2004/0136528 A1 * | 7/2004 | Muratani | ................ | 380/37 |

FOREIGN PATENT DOCUMENTS

| | | |
|---|---|---|
| EP | 1263163 A | 12/2002 |
| EP | 1601132 A | 11/2005 |
| FR | 2844409 A | 3/2004 |

OTHER PUBLICATIONS

Trichina E et al: "Secure and efficient AES software implementation for smart cards" Information Security Applications. 5th International Workshop, WISA 2004. Revised Selected Papers (Lecture Notes in Computer Science vol. 3325) Spring-Verlag Berlin: Germany, Jun. 26, 2004, pp. 1-14, XP002364801 ISBN: 3-540-24015-2.*

Courtois N. T. et al: "An Algebraic Masking Method to Protect AES Against Power Attacks" IARC, Jul. 1 2005, XP002344150 ICISC 2005.

(Continued)

*Primary Examiner* — Thanhnga Truong  
(74) *Attorney, Agent, or Firm* — Pehr B. Jansson; The Jansson Firm

(57) ABSTRACT

The method according to this invention concerns a method for automatically generating cryptographic algorithms with optional supplementary data, said algorithms comprising two different zones: external algorithm secrecy zone, in external parts of the algorithm exposed to side-channel analysis, and an internal purely cryptographic zone that is not exposed to side-channel analysis, such that in the algorithm secrecy zone, the code of the algorithm is locally made of random (or pseudo-random) and independent sequences of instructions and/or table-lookups chosen from some fixed set of instructions and random constants, with some fixed prescribed probability distribution, and such that the internal cryptographic security zone can be any cryptographic algorithm or method that handles algorithmic security only and does not have to be protected against side-channel attacks.

11 Claims, 1 Drawing Sheet

OTHER PUBLICATIONS

PCT/IB2005/002976, International Search Report, Jan. 31, 2006, European Patent Office, P.B. 5818 Patentlaan 2 NL—2280 HV Rijswijk.

PCT/IB2005/002976, Written Opinion of the International Searching Authority, Jan. 31, 2006, European Patent Office, D-80198 Munich.

* cited by examiner

METHOD AND APPARATUS FOR GENERATING CRYPTOGRAPHIC SETS OF INSTRUCTIONS AUTOMATICALLY AND CODE GENERATOR

BACKGROUND OF THE INVENTION

1. Field of the Invention

The present invention consists of building an apparatus for automated and secure generation of cryptographic algorithms using or not secret data. Said algorithms are generated by a secure module and have to be very different from each other.

2. Description of the Related Art

In the field of Pay TV, the card providers need to offer cryptographic protocols and algorithms different from one TV provider to another. Moreover some TV providers wish to change said cryptographic algorithm at predetermined period of time to increase the security of the system. One of the problems of the present invention is to offer secure cryptographic algorithm different from time to time or from one electronic system to another.

One other main problem to be solved is to achieve a good level of "algorithm secrecy". In addition the generating method is designed in a way that it is able of systematically achieving algorithms that are secure against both algorithmic attacks on them and implementation (side-channel) attacks on an electronic system. Both these security properties are NOT properties of each individual algorithm but a non-trivial property of the generating apparatus. In fact, most of the known cryptographic and side-channel attacks will not work simply and precisely due to the algorithm secrecy that is achieved by the present invention. The central question of "algorithm secrecy" does not even make sense for each individual cryptographic algorithm, and can be defined as the impossibility for an attacker to gain some useful knowledge about one algorithm by observing another algorithm.

In order to secure access, electronic transactions and data, one has to use cryptographic protocols and (as a sub-component) secure cryptographic algorithms (for example encryption or digital signature algorithms). The security of a cryptographic algorithm cannot be seen: only the contrary can be seen, as many of them are broken every year by a new non-trivial mathematical or algorithmic method. It is even harder to securely implement such an algorithm in an electronic apparatus such as a smart card. For this reason many companies and governments have always kept the designs of crucial cryptographic algorithms secret. This is a common practice for algorithms used in GSM SIM cards, and in pay-TV smart cards. Shall the secrecy of these algorithms be breached, for example by reverse-engineering, the security of many systems does collapse, and cloned pirate cards do proliferate.

In order to achieve secure execution of cryptographic protections and secure storage of cryptographic keys, it is recommended to use secure tamper-resistant hardware security devices, such as smart cards.

A secure cryptographic algorithm implemented in a smart card brings new security concerns, which goes far beyond mathematical security. Now the algorithm is under physical control of an adversary and there are countless new possibilities of interaction by the physical means. With smart cards, the attackers gained the possibility of measurement and/or perturbation of the physical, electrical, magnetical and optical environment of the code execution process. All these are additional channels, which in some way interact with secret information concealed inside the device, are side-channels. They do leak information that may allow recovery of this secret information, or some fraudulent interaction, yet without recovering the secret data. For these reasons, today all serious vendors of secure hardware tokens such as smart cards, incorporate countless hardware and software countermeasures against various side-channel attacks (also called physical attacks).

The next step will be certainly to design cryptographic algorithms that have "per se" a good resistance against various side-channel attacks, and for which the cost of additional protections will be essentially the cost of implementing the functionality of the algorithm. This has not been done so far and nobody really knows how to achieve it. When this is done however, we will in some sense go back in the security level achieved: instead of a well known algorithm such as triple DES that have been under intense scrutiny of hundreds of researchers for 30 years, and that nobody has really cracked in a practical sense, we will have a new algorithm that may prove insecure a few years later, as it happens surprisingly frequently to new crypto algorithms.

In the present invention, we will avoid this flaw and design algorithms that will be as secure as a published and well-known algorithm such as AES (or another standard cryptographic algorithm). Unfortunately, using a public algorithm may make it again vulnerable to side-channel attacks. A secret algorithm is better.

In the present invention we will achieve, at the same time, security against side channel attacks and the possibility to be as secure as a renowned cryptographic standard. The invention consists in "embedding" a well-known cryptographic algorithm into a new algorithm in a specific way, such that certain security objectives are achieved. The main of these security objectives is to achieve a good level of "algorithm secrecy". This goal is far from being obvious to achieve, as explained below, and according to opinions expressed by experts, it cannot be solved perfectly, yet it remains an important industrial issue that has to be addressed (for example in pay-TV or telecoms).

The problem of algorithm secrecy should be seen at three different levels:

1) In mathematics one cannot invent a "secret algorithm". Any algorithm with unknown bits of specification is secret, and has some entropy. At this level there is nothing non-trivial to invent.

2) In cryptology, one allows the attacker to interact with the algorithm, and the notion of secrecy of an algorithm becomes meaningful. One has to study the complex question of: to what extent the algorithm is indeed secret, since some partial information is available. Some algorithms will be secret; some can be partially or totally recovered by a skilled attacker. In many cases, the algorithm will be recovered by a non-trivial mathematical method, and it is not known how to prove that for some algorithm such a method does not exist. The expired Rivest-Shamir-Adleman US patent on RSA cryptosystem is also a patent on encryption algorithm secrecy. Indeed, it was for some time, about the only method known to publish the encryption algorithm and yet to keep the decryption algorithm secret. To this day very few methods to achieve this goal (i.e. achieving public key encryption) are known, and it is a highly non-trivial task to invent a new one. This demonstrates that algorithm secrecy is a highly difficult goal to achieve.

3) In embedded cryptology, for example when a cryptographic algorithm is implemented in a smart card, it is again a new world, even more constrained. As security is, the algorithm secrecy is even harder to achieve here. This is because; it has to hold not only when the adversary has access to the functionality of the algorithm (cf. point 2.) but when the side-channels are available.

At present time some smart cards use algorithms that are secret (for example for GSM operators). However to see to what extent they are indeed secret, this question has never been studied in the literature and no solutions to address this problem have been proposed.

An aim of this invention is to offer versions of a cryptographic algorithm with a good level of algorithm secrecy (how good will be explained later) and a good cryptographic security.

SUMMARY OF THE INVENTION

The present invention concerns a method for automatically generating cryptographic algorithms with optional supplementary data, comprising:

generating random or pseudo-random and independent sequences of instructions and/or table-lookups chosen from some fixed set of instructions and random constants; and combining said sequences with secure cryptographic algorithm that handles algorithmic security.

The term pseudo-random means appearing to be random to an attacker; for example, a pseudo-random sequence can be derived from a random initial seed by a pseudo-random number generator.

The combination of said two steps is done in a non-trivial technical way. For this, the algorithms comprise two different zones: external algorithm secrecy zone, in external parts of the algorithm exposed to side-channel analysis, and an internal purely cryptographic zone that is not exposed to side-channel analysis.

The external parts are the parts of the algorithm executed at the beginning and at the end of the execution process with some data potentially known to the attacker, and thus exposed to side-channel analysis.

In the algorithm secrecy zone, the code of the algorithm is locally made of random (or pseudo-random) and independent sequences of instructions and/or table-lookups chosen from some fixed set of instructions and random constants (chosen at random at generation and constant once the algorithm is generated). The random generation of a sequence of instructions and constants is done according to a fixed and prescribed probability distribution. This distribution is not at all meant to be uniform: for each instruction, we fix a probability of using it, that will for example typically depend on the previous one or two (or a small number) of previously chosen instructions. This method allows to be sure that each individual algorithm will contain many instructions that achieve cryptographic confusion, many instructions that achieve cryptographic diffusion, many instructions that are hard to recognise by power analysis attacks, and yet very few or no instructions that are very slow on the target CPU, and that are cryptographically weak transformations.

The internal cryptographic security zone can be any cryptographic algorithm or method that handles algorithmic security only and does not have to be protected against side-channel attacks. The internal parts are the parts of the algorithm executed between the external parts. Said method may be implemented in an electronic apparatus including a processor and a memory, the electronic apparatus being used at least for generating a cryptographic algorithm with the prescribed characteristics. This apparatus should preferably be a secure hardware device, as it can be itself an object of numerous attacks.

The advantages offered by the present invention are numerous:

1. Producing cryptographic algorithms in an automated and unattended way.
2. The high diversity of produced algorithms. In the present invention not only the data of a cryptographic algorithm is diversified, but also the instructions. This is apremiere in the area of protection against side-channel analysis.
3. Secrecy of the algorithms including their data and instructions.
4. Impossibility for an attacker to gain from an even complete description of many generated algorithms, any knowledge useful for an attacker about other algorithms generated by the same generating device.
5. Possibility of generating algorithms deterministically from a seed: this allows to avoid keeping a databse of generated algorithms, and to restrict the speed with which an (insider) and attacker of the generating module can "steal" cryptographic algorithms.
6. Possibility of choosing at each usage of generating device, the size of generated algorithms to be as big as the memory available on the target platform, i.e. as large as possible.
7. Possibility of choosing at each usage of generating device, the speed of generated algorithms not to exceed the computing power of the target platform.
8. Possibility of adjusting the level of cryptographic security of generated algorithms to the current needs, to be as strong as possible, yet not to exceed national or export regulations on usage of cryptology.
9. Possibility of choosing, presently only at the time of design of generating device, the instruction set of generated algorithms to adapt to side-channel vulnerabilities of the target platform.
10. Producing cryptographic algorithms that do not have to be given to cryptanalysts in order to be sure about their algorithmic security.

The points 1, 2, 3, 4, 5, 6, 7 and 10 are already achieved by the example of how to embody the invention described later and depicted in FIG. 1. Goals 8 and 9 are easy to achieve with the techniques of the present invention by allowing two additional inputs to the generating device that allow the user to modify the key size and the set of instructions with assigned probabilities. This however is optional and should remain so, because it allows also the user to generate on (purpose or accidentally) weak cryptographic algorithms, and in a way that will be hard if not impossible to detect.

BRIEF DESCRIPTION OF DRAWINGS

Other aims, advantages and characteristics of this invention will be shown when reading the following description of the method implementation according to this invention and a embodiment mode for an electronic apparatus adapted to this implementation given as non limiting example referring to the drawing here attached in which FIG. 1 show a diagram of the different steps of the method according to this invention.

DETAILED DESCRIPTION OF THE INVENTION

Figure 1:
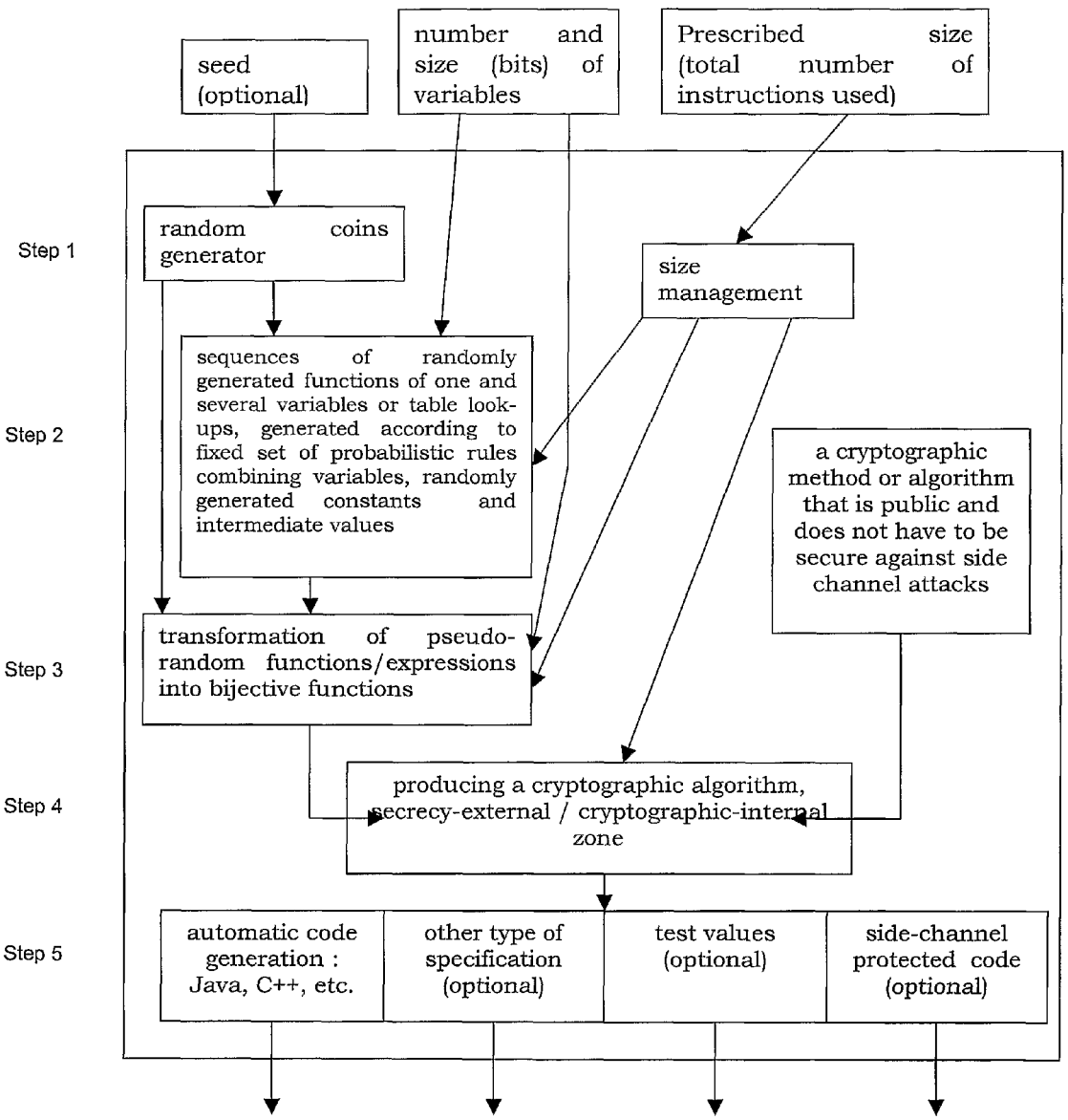

The method according to the invention aims at securing an electronic system or device, for instance a smart card, that implements some cryptographic protocol, which contains a cryptographic calculation procedure (also called cryptographic algorithm) with presence or not of secret data (for example of a secret key). This protection is achieved by another (master) electronic system or device, said generating device, that generates cryptographic algorithms for all the other devices (e.g. each individual smart card). Each individual electronic system include information processing means such as a processor and information storage means such as a memory. They can also be realized in wired logic. The cryptographic calculation method, hereafter called cryptographic algorithm is installed in the memory, for example ROM type, of said system. The processor of said system executes the calculation method by using (or not) a secret key, stored in a secret area of a memory, EEPROM type for example.

The present method for generating automatically a cryptographic algorithm is implemented in an electronic apparatus, (master generating device) which includes data processing means such as a processor and data storage means such as a memory. The method is incorporated in the memory, for instance of the ROM type for the said apparatus. The processor for the said apparatus carries out the method. The method could also be realized entirely in a wired logic.

The method according to the invention consists of automatically generating cryptographic algorithms for securing said electronic system and comprises the main following steps as seen in FIG. 1:

First of all, three parameters are introduced in the apparatus as optional inputs of said method: a seed, a total number of elementary functions that are used by said method, and the number and the bit-size of variables used by the algorithm (for example a 128-bit algorithm can be implemented using 16 variables on 8 bits each).

1) Then the method consists in generating a series of random numbers from said seed if provided (step 1);

2) Then an algorithm generates routines that are pseudo-random (in a certain sense) sequences of instructions (step 2);

3) Then an algorithm aggregates these sequences to form bijective routines (this step 3 is optional, not all cryptographic algorithms have to be bijective);

4) Then we perform a "cryptographic algorithm generation" in a step 4;

5) Then we translate the final algorithm in several desired formats and produce interesting derived data (step 5).

The different steps are developed hereafter:

Step 1): The first step comprises initialization routines. An optional (but very useful) ingredient is a seed, which is defined as a string of characters and first (optional) parameter of the apparatus of the present invention. In principle said seed is used in a pseudo-random number generator to expand it into an arbitrarily long strong of random bits. Alternatively, if no seed is provided, the randomness used in our program may come from other source (for example an internal random number generator). The second parameter of the program is (also optional, may be fixed) the total number of elementary functions that can be used in the algorithm that will be generated: this parameter determines the size, the execution speed, and cryptographic complexity of the generated algorithm. Then we apply the (optional) "bijective function generation algorithm" that is perfectly deterministic except that it takes its random coins from the string obtained in step 1. The output is one or several bijective functions. The inverses of these functions (e.g. a decryption routines together with an encryption routines) may be generated at the same time.

Step 2): Then the method executes an algorithm which generates routines that are sequences of instructions that are chosen pseudo-randomly or randomly following a fixed set of basic instructions and a fixed set of rules. Instructions are chosen randomly but do follow a certain probability distribution that does not have to be uniform, i.e the person that sets up or personalises the generating device has the right knowing instructions of the target platform to make certain instruction appear more frequently, and other less frequently). It is done as follows: one or several rules say that this or other instruction is chosen, with this probability, and what kind of inputs it is allowed to use. For example, it is specified that for one type of instruction the inputs are chosen randomly or pseudo-randomly, as being either one of the initial variables, or one of previous intermediate results, or obtained as a result by a previous function, or are a constant that is chosen randomly or pseudo-randomly. For each of the functions and for each of these cases, it will be realised with some fixed probability. The rules specify simply a set of probabilities, defined for all cases enumerated above (the choice of the functions and the constants, and their order is determined by the pseudo-random string generated in Step 1). Explicit rules also specify for each function, what kind of arguments it will receive and with what probability: for example for addition on 8 bits, we may require that the first argument is with probability 0.5 a random constant, and with probability 0.5 is chosen at random among all input variables and previous intermediate values in the computation. The second argument will be always chosen as one of the intermediate values, and if there is none, an initial variable chosen at random.

Step 3): Then the process executes a "bijective function generation algorithm", which aggregates the sequences from Step 2, to produce bijective routines (this step 3 is optional) and methods to achieve this are also chosen successively at random from a fixed set of known simple methods, that are described later. The outputs are one or several bijective functions. The inverses of these functions are generated at the same time (optional). In principle these function do not depend on the secret key but it is not forbidden. (Another option is not to require that the functions are bijective and skip the Step 3).

Step 4): In the "cryptographic function generation algorithm" the method consists in combining by successive applications one or several functions or routines obtained in Steps 2 or 3, and a publicly known and secure cryptographic algorithm such as AES (that is optional and may be a different kind of standard cryptographic primitive). In the case of a keyed algorithm, in principle all the input, the output and the key of the algorithm as AES have to be transformed by a combination of functions from Step 2, or in other words said keyed publicly known and secure cryptographic algorithm such as AES is inside concealed by other routines both at the beginning, at the end and at the key. In principle, both encryption and decryption algorithms are generated. In one variant, without the Step 3, the method of the present invention does not produce the decryption algorithm.

Step 5): The final step of the method is to translate the final algorithm in several desired formats. The algorithm will be output in principle at least as a C or Java source code. Interesting options include also outputting, and also a reference functional or mathematical specification. Moreover, it may also automatically generate test values: for example chose some random inputs and keys for the algorithm, record the output value that should be obtained, and keep all the intermediate values inside the execution of the algorithm at every major step. These test values can be used for testing and debugging any implementation of the algorithm, and can also be used as self-test values for the whole algorithm or parts of it, embedded to detect errors in the computation, in order to protect the algorithm against DFA-type attacks. Such a protected implementation can also be output. In general several implementations of the same algorithm may be output Only Step 3 requires further description.

Step 3 transforms a randomly generated function to a bijective routine that operates on the current state. The method consists in composing randomly chosen sub-routines, some of them being new or old pseudo-random permutation S-boxes, other being constructed with a generalised Feistel method defined as modifying one current variable at a time and combining it with an arbitrary function of all the other current variables and of randomly or pseudo-randomly generated constants, and some other functions may also be made bijective by adding or xoring to a current variable a special type of T-function called a parameter, that may contain large compositions of randomly or pseudo-randomly chosen T-functions.

We explained in more details said step 3 here below.

We want to generate a bijective function with k inputs and k outputs, each on 1 bit. For example k=4 and l=32.

In Step 2, we chose some subsets of basic CPU instructions. That can be all instructions available on a CPU, only the T-functions, only arithmetic operations, only logical operations etc. Then in Step 2 we obtain several random or pseudo-random sequences of functions that combine these basic functions, and that follow the probability distribution defined by the rules.

Then in order to write a bijective function in Step 3, we may use one of the three methods:

3.1.)

We use arbitrary functions of all variables except one called x, and add the result of this function by a group operation (plus, XOR, or other) to x. This is a kind of generalised Feistel construction. The method 3.1. stems from basic invention of Horst Feistel used in the Data Encryption Standard (and published in Horst Feistel: "Cryptography and computer privacy", Scientific American, vol. 228, No. 5, pp. 15-23, May 1973). The usage of T-functions to build bijective functions can be achieved in many ways due to the recent Shamir-Klimov theory of T-functions (In Alexander Klimov, Adi Shamir: A New Class of Invertible Mappings. CHES 2002, Springer LNCS 2523, pp. 470-483). The present invention does not depend on these constructions and can use any other methods of transforming functions into bijective functions (permutations) that is known or will be invented in the future.

3.2.)

We may use the recent Shamir-Klimov construction: add to a variable x by XOR or addition a special kind of function, that is "a T-function" and that is "a parameter".

3.3.)

We may apply a bijective substitution table that has been previously generated pseudo-randomly from some number of available random coins (that again come from Step 1.)

The bijective function is defined by one of these three methods. Each method is chosen at random with a fixed distribution of probabilities. Then one can combine several such functions. The total number of functions to combine, and the total number of basic function to be used in each of them, is determined by diving the second parameter in equal parts.

With method 3.1. or 3.2., for any n, if we choose the total number of functions to be sufficiently large, the first n instructions of the encryption scheme generated will just be arbitrary and random operations. If we look at the beginning (and also at parts of limited size elsewhere) of the cryptographic algorithm, we achieve perfect algorithm secrecy. This is the sense of the present invention. A reasonably "good" algorithm secrecy is achieved by imposing perfect secrecy for large fragments of it at the beginning and the end of the algorithm. This precise kind of architecture, is also motivated by the DPA attacks that operate at the beginning or at the end of execution, and if these parts are really well secured, DPA attacks should become impossible.

In the present invention, there are two zones in the generated crypto algorithm: the external zone, the secrecy zone that is meant to protect against side-channel attacks, and the internal zone that achieves cryptographic security alone. Said internal zone is concealed with the external and secrecy zone and thus is protected from the side-channel attacks by means of said secrecy zone. For example, by this method we keep the security of AES and yet discard the possibility to use AES (the AES functionality) as being dangerous. In addition it is recommended (but not obligatory) to do not use at all the key of the algorithm in the external zone: AES requires a lot of care in implementing the key injection, and in principle it is not necessary to use the key elsewhere, which will not make the whole encryption more secure, and might make it less secure for DPA attacks.

The method generated for securing an electronic system comprises:

Computation at the beginning and/or at the end of the method of random or pseudo-random and independent sequences of instructions and/or table-lookups, chosen from some fixed set of instructions and random constants;

Execution in the middle of the method of a combination of said sequences of instructions and/or table-lookups with a cryptographic algorithm that handles algorithmic security The method of the present invention allows to generate algorithms pseudo-randomly, i.e. the seed arbitrarily calculated allows to obtain finally an algorithm in a random way and deterministically, i.e. for a same seed, the algorithm obtained is the same.

In comparison with "hand-made" algorithms that simply follow the state of the art, the present invention offers the following advantages:

a) it produces deterministically, unique and very different algorithms for every initial seed;

b) in strict cryptographic security, these algorithms will be as secure as a well known algorithm such as AES, because they will embed AES inside;

c) moreover, these algorithms will be at least as secure as an implementation of AES secured against side-channel attacks. This is because, due to the method of the present invention, though AES is embedded inside, there is no possibility to really access this internal AES functionality in any effectively verifiable way (which is in fact a consequence of algorithm secrecy). The method of the present invention may be combined with other methods for better security. The algorithm secrecy has advantages that other counter-measures don't have and improves the security of other counter-measures too;

d) the algorithms of the present invention will even have a natural "per se" resistance against many side channel attacks: this again being due to algorithm secrecy, but only when it is brought to a certain level. We require in fact that not only the algorithm is secret, but also that the initial and the final part of the algorithm are secret, and this in a strong sense: not only they cannot be reproduced as functionality, but even their instructions carried by the CPU are secret;

e) the method according to the present invention combines freely the three approaches 3.1., 3.2. and 3.3., as well as other constructions;

f) unlike most cryptographic designs, the method according the present invention does not instantiate the constructions with some very special functions or special S-boxes with acute design requirements, but insists on the fact that they have to be randomly taken among all possible S-boxes or functions that are in the prescribed distribution;

g) the method according to the present invention generates pseudo-random cryptographic algorithms, and in an automated way. Generating secure cryptographic algorithms systematically and deterministically is much harder than just generating one algorithm—each of them has to be good;

h) the method produces an important variety of cryptographic algorithms when we look at their source code. Instead of achieving pseudo-randomness of internal data inside the algorithm, which is achieved in every good cryptographic algorithm, we tend to achieve the pseudo-randomness of the algorithm code itself. Moreover, this pseudo-randomness is not used to achieve cryptographic security (that in our invention is assured by AES), but to achieve algorithm secrecy.

In implementing the present invention there are several extensions and options possible.

The generating apparatus can modify and take as an additional input the set of instructions with assigned conditional probabilities to be used in the algorithms.

The generating apparatus can take as an additional input the key size of the final algorithms.

The generating apparatus can be a part of a device for which it provides cryptographic algorithms.

The generating apparatus may produce algorithms for devices to which it is connected directly or not and for example for remote devices.

The apparatus for automated generation of algorithms may produce systematically the corresponding decryption algorithm.

All the random choices during algorithm generation can be really random or taken from any type of random generator, or can be done pseudo-randomly and derived from the seed.

It is possible and advocated to impose no involvement of the secret key in the most exposed parts of the algorithm secrecy zone.

It is possible to impose that the first key-dependent instructions of the encryption algorithm are handled deep inside the encryption process after a series of secret transformations that can contain arbitrarily long sequences of instructions. Then the attacker lacks knowledge of inputs of the key-dependent parts, and thus the algorithm is protected against side channel attacks such as Differential Power Analysis (DPA).

The generating apparatus can be implemented in such a way that the test values are used to automatically generate a code with a protection against physical perturbation (DFA) attacks with random handling of trial encryptions with test values.

The generating apparatus can be used to produce or personalise smart cards or other tamper-resistant tokens.

The generating apparatus can be used to produce pseudo-random temporary unique cryptographic algorithms, send in their executable form to remote devices, and used for key-agreement, authentication and encryption in the current session.

The invention claimed is:

1. The method for generating, in an electronic apparatus, pseudo-random cryptographic algorithms, comprising:
   generating random or pseudo-random and independent sequences of instructions or random or pseudo-random and independent sequences of table-lookups chosen from some fixed set of instructions and random constants; and
   generating said cryptographic algorithms by combining said sequences of instructions or sequences of table-lookups with a cryptographic algorithm that handles algorithmic security, called algorithmic secure cryptographic algorithm;
   wherein said algorithms comprise two different zones: external algorithm secrecy zone, in external parts of the algorithm exposed to side-channel analysis, and an internal purely cryptographic zone that is not exposed to side-channel analysis, whereby in the algorithm secrecy zone, the code of the algorithm is locally made of random or pseudo-random and independent sequences of instructions or random or pseudo-random and independent sequences of table-lookups chosen from some fixed set of instructions and random constants, and whereby the internal cryptographic security zone consists of any cryptographic algorithm or method that handles algorithmic security only and does not have to be protected against side-channel attacks.

2. The method according to claim 1, further comprising generating random or pseudo-random and independent sequences of instructions or random or pseudo-random and independent sequences of table-lookups chosen from some fixed set of instructions and random constants, with some fixed prescribed probability distribution.

3. The method according to claim 2 or 1 wherein the algorithmic secure cryptographic algorithm is a reversible encryption algorithm and said sequences of instructions or sequences of table-lookups are sequences of bijective routines built out of the random sequences instructions or random sequences of table-lookups generated, with or without adding key-dependent constants, and wherein to transform a randomly generated function to a bijective routine that operates on the current state comprises:
   composing randomly chosen sub-routines selected from:
      new or old pseudo-random permutation S-boxes,
      subroutines constructed with a generalized Feistel method defined
         as modifying one current variable at a time and combining the modified current variable with an arbitrary function of all the other current variables and of randomly or pseudo-randomly generated constants, and
      functions produced by adding or xoring to a current variable a special type of T-function called a parameter, that contain large compositions of randomly or pseudo-randomly chosen T-functions.

4. The method according to claim 1, wherein the first key-dependent instructions of the generated encryption algorithm is handled deep inside the encryption process after a series of secret transformations that contain arbitrarily long sequences of instructions chosen at random with some prescribed distribution of probabilities.

5. The method according to claim 1, wherein the method generates in addition, a readable specification of the generated cryptographic algorithm or the test values of the output algorithm.

6. The method according to claim 1, wherein test values are used to automatically generate a code with a protection against DFA attacks with random handling of trial encryptions with test values.

7. The method according to claim 1, further comprising that the method produces pseudo-random temporary unique cryptographic algorithms, in sending them in their executable form to remote devices to be used for key-agreement, authentication or encryption in the current session.

8. The method according to claim 1 wherein said algorithm further comprises:

generating random or pseudo-random and independent sequences of instructions
or random or pseudo-random and independent sequences of table-lookups chosen from some fixed set of instructions and random constants; and
generating said cryptographic algorithms by combining said sequences of instructions or table-lookups with a cryptographic algorithm that handles algorithmic security, called algorithmic secure cryptographic algorithm.

9. An electronic apparatus to create pseudo-random cryptographic algorithms comprising:
storage means and data processing means, characterised in that said processing means comprise means for generating random or pseudo-random and independent sequences of instructions or random or pseudo-random and independent sequences of table-lookups chosen from some fixed set of instructions and random constants;
and in that said data processing means generate cryptographic algorithms by combining said sequences of instructions or sequences of table-lookups with a cryptographic algorithm stored in said storage means that handles algorithmic security;
wherein said algorithms comprise two different zones: external algorithm secrecy zone, in external parts of the algorithm exposed to side-channel analysis, and an internal purely cryptographic zone that is not exposed to side-channel analysis, whereby in the algorithm secrecy zone, the code of the algorithm is locally made of random or pseudo-random and independent sequences of instructions or random or pseudo-random and independent sequences of table-lookups chosen from some fixed set of instructions and random constants, and whereby the internal cryptographic security zone consists of any cryptographic algorithm or method that handles algorithmic security only and does not have to be protected against side-channel attacks.

10. A method for securing an electronic system involving a cryptographic algorithm by creating pseudo-random cryptographic algorithms, the method comprising:
computation of random or pseudo-random and independent sequences of instructions or random or pseudo-random and independent sequences of table-lookups, chosen from some fixed set of instructions and random constants;
execution of a combination of said sequences of instructions or sequences of table-lookups with a cryptographic algorithm that handles algorithmic security;
wherein said algorithms comprise two different zones: external algorithm secrecy zone, in external parts of the algorithm exposed to side-channel analysis, and an internal purely cryptographic zone that is not exposed to side-channel analysis, whereby in the algorithm secrecy zone, the code of the algorithm is locally made of random or pseudo-random and independent sequences of instructions or random or pseudo-random and independent sequences of table-lookups chosen from some fixed set of instructions and random constants, and whereby the internal cryptographic security zone consists of any cryptographic algorithm or method that handles algorithmic security only and does not have to be protected against side-channel attacks.

11. An electronic system having the capability of creating pseudo-random cryptographic algorithms, comprising:
information processing means and information storage means comprising:
means for computing random or pseudo-random and independent sequences of instructions or random or pseudo-random and independent sequences of table-lookups, chosen from some fixed set of instructions and random constants; and
means for executing a combination of said sequences of instructions or sequences of table-lookups with a cryptographic algorithm that handles algorithmic security;
wherein said algorithms comprise two different zones: external algorithm secrecy zone, in external parts of the algorithm exposed to side-channel analysis, and an internal purely cryptographic zone that is not exposed to side-channel analysis, whereby in the algorithm secrecy zone, the code of the algorithm is locally made of random or pseudo-random and independent sequences of instructions or random or pseudo-random and independent sequences of table-lookups chosen from some fixed set of instructions and random constants, and whereby the internal cryptographic security zone consists of any cryptographic algorithm or method that handles algorithmic security only and does not have to be protected against side-channel attacks.

* * * * *